No. 12,496. REISSUED JUNE 12, 1906.

B. O. TILDEN.

SIPHON CLOSET.

APPLICATION FILED MAR. 30, 1906.

Witnesses:
Harry Fleischer
Robert Adt.

Inventor:
Bert Olen Tilden,
By his Attorney,
F. H. Richards.

UNITED STATES PATENT OFFICE.

BERT OLEN TILDEN, OF NEW YORK, N. Y., ASSIGNOR TO AMERICAN SANITARY WORKS, OF NEW YORK, N. Y., A CORPORATION OF NEW YORK.

SIPHON-CLOSET.

No. 12,496. Specification of Reissued Letters Patent. Reissued June 12, 1906.

Original No. 770,027, dated September 13, 1904. Application for reissue filed March 30, 1906. Serial No. 309,005.

*To all whom it may concern:*

Be it known that I, BERT OLEN TILDEN, a citizen of the United States, residing in New York, borough of Brooklyn, in the county of Kings and State of New York, have invented certain new and useful Improvements in Siphon-Closets, of which the following is a specification.

This invention has reference to siphon apparatus for water-closets; and it is an object thereof to furnish a construction in which the discharge-outlet shall be of relatively large area throughout its entire length, so as to successfully pass obstructive materials of considerable mass, also to accomplish this result without the introduction of internal projections or providing the outlet with mechanical strictures or such other obstructive devices introduced in or extending into the outlet of the discharge-pipe as would tend to clog the same and interfere with the movement of the outgoing stream or catch up and stop any masses of material.

In prior practices it has been common to reduce the outlet to form a "choke," thereby to more surely obtain the water-plug of sufficient solidity to accomplish the siphoning action necessary to the proper operation of the closet. For accomplishing these objects the discharge-pipe of the usual siphon form and arrangement is led out of the closet and then passes upward to form the upper bend and then downward and inwardly for the purpose more especially of bringing it to a desirable position for taking away the stream underneath the bowl of the closet. With my present improvements, however, the pipe may be carried more directly and then carried down vertically, if so desired.

An embodiment of the present invention is set forth on the accompanying sheet of drawings, whereon—

Figure 1:
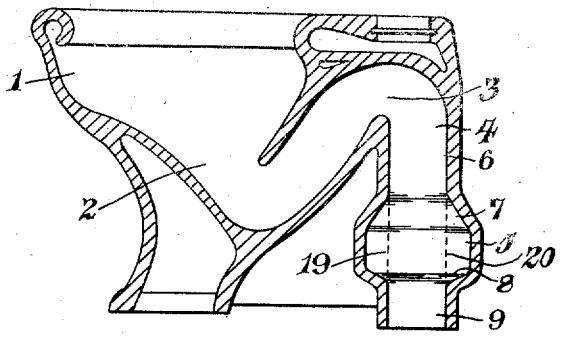
Figure 2:
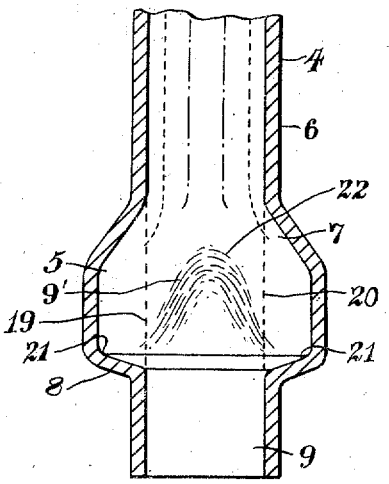

Figure 1 illustrates a sectional view of a bowl with the improvement applied, and Fig. 2 is a diagrammatic illustration of the action of the stream in the outlet at the point of improvement.

Similar characters of reference indicate like parts throughout the figures.

The bowl is represented by 1, from which at 2 proceeds an outlet comprising a siphoning passage or inlet or upleg 3 and an outlet-passage or downleg 4, having an enlargement, (indicated in a general way at 5,) so that the stream of water in coming down the portion 6 of the pipe 4 when it reaches the point 7 naturally begins to spread, and it will then strike upon the abutment portion 8 of the enlargement or chamber 5. The water striking upon said part 8 is naturally deflected and retarded in its movement, and the water obstruction thus resulting to the oncoming stream from the portion 6 tends all the more to fill the outward part of the chamber 5 with fluid, which in its turn tends further to obstruct the stream coming down through the portion 6, and in connection with this action that portion 9′ of the water directly deflected laterally toward the center of the pipe from the abutment-face 8 tends to form a fountain or water obstruction extending entirely across the pipe and which so coacts with the incoming stream itself (obstructed and retarded, as already referred to) as to slow up the velocity of the water immediately below in the portion 9 of the pipe, and thus form in that portion of the pipe a solid stream. This important result is also accomplished, notwithstanding that the said portion 9 of the outlet-pipe may be as large, or nearly as large, as the upper portion 6. In this way any masses of material which will readily pass from the bowl through the outlet at 2 may be successfully passed through the entire length of the pipe, and so finally disposed of without liability of the outlet-pipe becoming choked or blocked thereby at any portion in its length due to mechanical strictures in the outlet. In this way I form a water-plug in a pipe of relatively large size, which plug will drop in a solid body through that portion 9 of the pipe 4, thus drawing down the air as the plug precipitates and creates a vacuum in portion 6 of the said pipe 4. Thus an important feature accomplished in this improvement is that the outlet-pipe from the point where it leaves the bowl to where it finally enters the main pipe can be of unrestricted size throughout. The sudden enlargement of the outlet-pipe into a chamber would bring in the principle in hydraulics (at least when the pipe is full of fluid) that the passage of a stream of a given velocity from a relatively small pipe into a larger pipe or chamber tends to re-form the stream into one of larger diameter of lesser velocity and that this larger stream passing farther along the conduit until it again enters the smaller pipe at the point of such entrance again tends to re-form itself in a small stream whose velocity is equal to the reduction in the size of the stream.

The principle upon which my present improvement operates I apprehend is in substantial accordance with the principle diagrammatically illustrated in Fig. 2. For instance, if that portion 6 of pipe 4 be a pipe of, say, three-inch diameter and if the portion 6 be in line with and a continuation of said portion 9, the two pipes being connected by a large chamber, as 5, then water flowing through the portion 6 at a speed, for instance, of ten feet in a given period will re-form on entering the chamber 5 into a stream of different size and velocity. These speeds will of course be approximately proportionate to the areas of the pipes, which in the instance illustrated are about in the proportion of seven to nineteen, respectively—that is to say, the stream flowing through the portion 6 at a speed of ten feet per second would normally re-form into a stream in the chamber 5 with a velocity of less than four feet per second. In practice of course the stream does not instantaneously become a solid stream on the first discharge through the portion 6; but this comparison will serve to illustrate the principle by which the water entering the pipe 9 from the larger portion 5 of the conduit normally operates to effect a "fluid obstruction" or choke without the use of any reduction of the pipe and without the employment of any mechanical stricture or like device to interpose into the line of the pipe.

It will be noted that no mechanical obstruction is introduced within the conduit and no shoulder or device is made to project in any wise into the line of the outlet-pipe. The peculiar action of the apparatus by which the hydraulic choke is created is an action that is entirely different than would result from the introduction of any projection or abutment into the line of the conduit. It will be observed that a very important and practical advantage of my present improvement is that a complete siphonic action may be quickly and effectively produced in a vertical pipe without curves or bends and also free of any mechanical choke or restriction.

In Figs. 1 and 2 the dotted lines 19 20 indicate the pipe 4, continued from portion 6 to the portion 9 in line therewith. It may be here remarked that the first part of the stream of water coming down through the pipe (when the outlet-pipe is vertical, as preferred in practice) encounters in the enlargement or chamber a body of air normally stationary, and it is obvious the first effect of the descending water against such body of air will be to somewhat compress the air in the upper portion of said chamber, and thus tend to spread and divert the same, this action of the air being immediately opposed by the relatively large surface at 21. There are thus set up within the chamber movements of air-currents somewhat complex in character, but having as the result thereof an impeding action on the incoming water. For illustration of one feature of this peculiar action of the inclosed air I have drawn the fine lines at 22, indicating what I deem to be the probable lines of resistance at the moment referred to within the mass of air in the air-chamber, especially with regard to its tendency to flow out of said chamber into the portion 9, which lines, it will be noted, follow somewhat the arrangement of the similar lines which are understood to be formed in the case of sand flowing out of the ordinary hour-glass.

By the term "choke" as used in the claims I mean any kind of a choke which does not define itself with the wall-line of the outlet-pipe.

A feature of my improvement is that the discharge-conduit comprises two pipe-sections of similar form and size, one located above the other, but the two located in alinement, the interior of the conduit-sections communicating with an enlarged chamber combined with a laterally-disposed wall located outside of the zone of the conduit-opening or the interior wall of said conduit, and which forms an apron or splash-base for deflecting the downflowing stream into a plane transverse to the longitudinal axis of the conduit, whereby this transverse flow creates a "water-seat," upon which may pile other waters emanating from the inner zones, so as to form a solidified water-plug, which when of proper weight so precipitates as to produce efficient siphonic action.

I do not confine myself to the precise construction and shape of the outlet as herein shown and within the purview of this invention may resort to various modifications.

Having thus described my invention, I claim—

1. The combination with a siphon water-closet bowl, of an outlet-passage therefrom which is at no point of less caliber in cross-section than the siphoning-passage in the bowl, which outlet contains an interior enlargement provided with a reflecting-surface in position to receive the impact of the water as it passes through the enlargement and sufficiently abrupt to cause the water reflected therefrom to impede the flow of water through the outlet, whereby a choking effect is produced to establish siphonic action.

2. The combination with a siphon water-closet bowl, of an outlet-passage therefrom which is at no point of less caliber in cross-section than the siphoning-passage in the bowl, which outlet embodies an interior enlargement provided with a reflecting-surface located at the base of the enlargement and in position to receive the impact of the water as it passes through the enlargement and sufficiently abrupt to cause the water reflected therefrom to impede the flow of water through the outlet, whereby a choking effect is produced to establish siphonic action.

3. The combination with a siphon water-closet bowl, of an outlet-passage therefrom comprising two pipe-sections which are each at no point of less caliber in cross-section than the siphoning-passage in the bowl, and between which sections is provided an enlargement having a reflecting-surface at the base thereof so positioned as to receive the impact of the water as it passes through the enlargement and sufficiently abrupt to cause the water reflected therefrom to impede the flow of water through the outlet, whereby a choking effect is produced to establish siphonic action.

4. The combination with a siphon water-closet bowl, of an outlet-passage therefrom which is at no point of less caliber in cross-section than the siphoning-passage in the bowl, which outlet contains an interior enlargement with its wall tapering to the upper portion of the outlet and provided with a reflecting-surface in position to receive the impact of the water as it passes through the enlargement and sufficiently abrupt to cause the water reflected therefrom to impede the flow of water through the outlet, whereby a choking effect is produced to establish siphonic action.

5. The combination with a siphon water-closet bowl, of an outlet-passage therefrom which is at no point of less caliber in cross-section than the siphoning-passage in the bowl, which outlet embodies an interior enlargement provided with a reflecting-surface communicating with the lower portion of the outlet and in position to receive the impact of the water as it passes through the enlargement and sufficiently abrupt to cause the water reflected therefrom to impede the flow of water through the outlet, whereby a choking effect is produced to establish siphonic action.

6. In a siphon water-closet, the combination with a bowl, of an outlet-passage and an enlarged chamber formed integral therewith, said chamber gradually flaring from one portion of the passage and communicating with another portion through an abrupt shoulder effective to establish siphonic action, the outlet-passage above the enlarged chamber being at no point of substantially less cross-sectional area than the inlet-passage in the bowl.

7. In a siphon water-closet, the combination with a bowl, of an outlet, an enlargement situated in said outlet, the wall of the enlargement gradually proceeding from one portion of the outlet and so communicating with another portion thereof as to form an abrupt shoulder effective to establish siphonic action a part of which shoulder is outside of the interior line of the wall of said outlet at any point thereof above and below said enlargement.

8. The combination with a siphon water-closet bowl, of an outlet-passage therefrom having therein an enlargement or chamber provided with a reflecting-surface in position to receive the impact of the water as it passes through the outlet and sufficiently abrupt to impede the flow of such water through the outlet whereby a choking effect is provided to establish siphonic action, the outlet-passage above and below the enlarged chamber each being of substantially uniform cross-sectional area throughout its length.

9. The combination with a siphon water-closet bowl, of an outlet-passage therefrom widened out intermediate its ends to form an enlargement or chamber with an abrupt bottom wall forming an annular reflecting-surface in position to receive the impact of the water as it passes through the outlet and sufficiently abrupt to impede the flow of such water through the outlet whereby a choking effect is provided and siphonic action first established in the region of such bottom wall.

10. A water-closet bowl having a siphon-passage therefrom, the outlet or downleg of which is provided with an enlarged portion or chamber separating such outlet into an upper and a lower portion, such upper portion being at no point of substantially less cross-sectional area than the inlet-passage in the bowl, the bottom of said chamber being in position to receive the impact of the water as it passes through the outlet and sufficiently abrupt to impede the flow of water through such outlet, whereby a choking effect is produced to establish siphonic action, the wall of the lower portion of such outlet running from the inner edge of the bottom wall of such chamber.

11. A siphon water-closet bowl having a siphon-passage therefrom the outlet-passage or downleg of which is widened out to provide an enlargement or chamber having a deflecting-surface in position to receive the impact of the water as it passes through such outlet and sufficiently abrupt to impede the flow of such water through the outlet thereby to establish siphonic action, the area of such outlet-passage being approximately not less at any point than substantially equal to the area of the inlet-passage.

12. The combination with a siphon water-closet bowl, of an outlet-passage therefrom formed without contracting it throughout the region of its upper portion and widened out under such upper portion to a greater diameter than that of such upper portion to form an enlarged chamber, and then contracted at the lower end of such enlarged chamber to form a sufficiently abrupt surface to establish siphonic action.

13. The combination with a siphon water-closet bowl, of a siphon member having an outlet-passage widened out intermediate its ends to form a chamber having greater diameter than any other part of the outlet-passage above and below such chamber, and having a reflecting-surface in position to receive the impact of the water as it passes through the outlet-passage and sufficiently abrupt to impede the flow of such water thereby to establish siphonic action.

14. In a siphon water-closet, the combination with a bowl, of a siphon member having an outlet-passage widened out intermediate its ends to form an enlargement or chamber provided with an abrupt surface effective to deflect the water and establish siphonic action.

BERT OLEN TILDEN.

Witnesses:
C. P. WEED,
F. E. BOYCE.